US012482946B2

(12) United States Patent
Zhou et al.

(10) Patent No.: US 12,482,946 B2
(45) Date of Patent: Nov. 25, 2025

(54) MILLIMETER-WAVE ANTENNA-IN-PACKAGE AND TERMINAL DEVICE

(71) Applicant: HUAWEI TECHNOLOGIES CO., LTD., GuangDong (CN)

(72) Inventors: Weixi Zhou, Shanghai (CN); Xianbiao Wang, Shanghai (CN); Guowen Liu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 227 days.

(21) Appl. No.: 17/891,498

(22) Filed: Aug. 19, 2022

(65) Prior Publication Data

US 2022/0399644 A1 Dec. 15, 2022

Related U.S. Application Data

(63) Continuation of application No. PCT/CN2020/076294, filed on Feb. 22, 2020.

(51) Int. Cl.
*H01Q 9/04* (2006.01)
*H01P 1/203* (2006.01)
(Continued)

(52) U.S. Cl.
CPC ......... *H01Q 9/0435* (2013.01); *H01P 1/2039* (2013.01); *H01P 1/212* (2013.01); *H01Q 1/2283* (2013.01); *H01Q 21/065* (2013.01)

(58) Field of Classification Search
CPC .. H01Q 9/0435; H01Q 1/2283; H01Q 21/065; H01Q 9/0414; H01Q 21/24; H01P 1/2039; H01P 1/212
See application file for complete search history.

(56) References Cited

U.S. PATENT DOCUMENTS 10,051,488 B1 8/2018 Vannucci et al.
2006/0250308 A1 11/2006 Pinel et al.
(Continued)

FOREIGN PATENT DOCUMENTS

CN 105552555 A 5/2016
CN 108879086 A 11/2018
(Continued)

OTHER PUBLICATIONS

P. Zhu, Z. Ma, G. A. E. Vandenbosch and G. Gielen, "160 GHz harmonic-rejecting antenna with CMOS rectifier for millimeter-wave wireless power transmission," 2015 9th European Conference on Antennas and Propagation (EuCAP), Lisbon, Portugal, 2015, pp. 1-5. (Year: 2015).*
(Continued)

*Primary Examiner* — Dimary S Lopez Cruz
(74) *Attorney, Agent, or Firm* — Rimon PC

(57) ABSTRACT

A millimeter-wave antenna-in-package includes a substrate, and a radiation structure and a first antenna feeder that are disposed in the substrate. The first antenna feeder includes an antenna matching stub, a feeder transmission strap, and a first harmonic suppression unit. A first end of the antenna matching stub is connected to the radiation structure. The first harmonic suppression unit includes a first transmission part and a first bent part. A first end of the first bent part is connected to a first end of the first transmission part, and a second end of the first bent part and a second end of the first transmission part form a first opening. A second end of the antenna matching stub is connected to the feeder transmission strap through the first transmission part, and the feeder transmission strap extends along the first reference direction.

20 Claims, 7 Drawing Sheets

(51) Int. Cl.

| | |
|---|---|
| ***H01P 1/212*** | (2006.01) |
| ***H01Q 1/22*** | (2006.01) |
| ***H01Q 21/06*** | (2006.01) |

(56) References Cited

U.S. PATENT DOCUMENTS

| | | | |
|---|---|---|---|
| 2010/0123619 A1 | 5/2010 | Shijo et al. | |
| 2015/0180120 A1 | 6/2015 | Pietraski et al. | |
| 2020/0007103 A1* | 1/2020 | Nam | H01L 23/552 |
| 2020/0161766 A1* | 5/2020 | Liu | H01Q 9/045 |
| 2021/0328350 A1* | 10/2021 | Takayama | H01Q 5/50 |

FOREIGN PATENT DOCUMENTS

| | | | |
|---|---|---|---|
| CN | 208478556 | U | 2/2019 |
| CN | 109980332 | A | 7/2019 |
| CN | 110048218 | A | 7/2019 |
| EP | 3553883 | A1 | 10/2019 |
| WO | 2018210054 | A1 | 11/2018 |

OTHER PUBLICATIONS

Sharir, V. (Feb. 16, 2015b). Improving the second harmonic rejection of side-coupled filters. Microwave Journal. https://www.microwavejournal.com/articles/23815-improving-the-second-harmonic-rejection-of-side-coupled-filters (Year: 2015).*

Peng Zhu et al., "160 GHz Harmonic-Rejecting Antenna with CMOS Rectifier for Millimeter-Wave Wireless Power Transmission," IEEE, Apr. 13-17, 2015; 5 total pages.

Chandan Kumar Ghosh, "Harmonics Suppression of Microstrip Antenna Using Open Ended Stubs," https://doi.org/10.1002/mop.29809, Mar. 28, 2016; 6 total pages.

* cited by examiner

MILLIMETER-WAVE ANTENNA-IN-PACKAGE AND TERMINAL DEVICE

CROSS-REFERENCE TO RELATED APPLICATIONS

This application is a continuation of International Application No. PCT/CN2020/076294, filed on Feb. 22, 2020, the disclosure of which is hereby incorporated by reference in its entirety.

TECHNICAL FIELD

This application relates to the field of communication technologies, and in particular, to a millimeter-wave antenna-in-package and related terminal device.

BACKGROUND

As a transceiver component at an end of a communication system, an antenna plays an important role in the communication system. An antenna-in-package technology may integrate an antenna and a chip in one package based on a packaging material and a manufacturing process. This balances performance, costs, and the size of the antenna, and therefore the antenna-in-package technology is an important solution for 5G millimeter-wave mobile communications.

Similar to 4G communications, 5G communications also have strict requirements on spur. Due to non-linearity of the power amplifier and other components in the communication system, when power is high, a harmonic in a transmit signal of the antenna forms a large spurious signal, especially the second harmonic which causes the largest spurious signal. As a result, spurious emission may exceed a threshold. Due to advantages of low loss and small occupied space, harmonic suppression on an antenna side becomes a focal point of attention at present. However, because a radio frequency feeder of the millimeter-wave antenna-in-package is usually narrow, the requirement on an antenna-in-package manufacturing process is high, and it is difficult to implement the harmonic suppression on the antenna side.

SUMMARY

This application provides a millimeter-wave antenna-in-package and a terminal device, to implement harmonic suppression on an antenna feeder side, and reduce a requirement for manufacturing process precision.

The millimeter-wave antenna-in-package in this application includes a substrate, and a radiation structure and a first antenna feeder that are disposed in the substrate, where the first antenna feeder includes an antenna matching stub, a feeder transmission strap, and a first harmonic suppression unit; a first end of the antenna matching stub is connected to the radiation structure, the antenna matching stub extends along a side that is away from the radiation structure, and an extension direction of the antenna matching stub is a first reference direction; the first harmonic suppression unit includes a first transmission part and a first bent part; the first transmission part extends along the first reference direction; a first end of the first bent part is connected to a first end of the first transmission part; a second end of the first bent part and a second end of the first transmission part form a first opening; a second end of the antenna matching stub is connected to the feeder transmission strap through the first transmission part; and the feeder transmission strap extends along the first reference direction.

In the millimeter-wave antenna-in-package in this application, a harmonic suppression unit is disposed between the antenna matching stub and the feeder transmission strap. The harmonic suppression unit includes a transmission part connected in series between the antenna matching stub and the feeder transmission strap and a bent part connected to the transmission part.

The bent part and the transmission part form an opening structure. This is equivalent to serially connecting a resonant circuit between the antenna matching stub and the feeder transmission strap, so that a band-stop characteristic curve may be formed at frequencies needing to be suppressed, to achieve harmonic suppression effect. In addition, the harmonic suppression unit with the opening structure has a low requirement on manufacturing process precision. This facilitates manufacturing of a millimeter-wave antenna-in-package with a narrow radio frequency feeder, and also meets requirements of the millimeter-wave antenna-in-package for a compact structure, a flexible design, and easy to package. Manufacturability and mass production of the millimeter-wave antenna-in-package are improved.

In some possible implementations, the first bent part includes a first horizontal extension part and a first vertical connection part. An extension direction of the first horizontal extension part is parallel to the first reference direction, and an extension direction of the first vertical connection part is perpendicular to the first reference direction. A first end of the first vertical connection part is connected to the first end of the first transmission part, a second end of the first vertical connection part is connected to a first end of the first horizontal extension part, and a second end of the first horizontal extension part and the second end of the first transmission part form the first opening. A length of the first horizontal extension part is less than or equal to that of the first transmission part. The first bent part facilitates a design of a related parameter, and harmonic suppression may be easily implemented by the millimeter-wave antenna-in-package at a required specific frequency.

In some possible implementations, the length of the first horizontal extension part is equal to ¼ of a wavelength of a second harmonic in a transmit signal of the millimeter-wave antenna-in-package, to effectively suppress a second harmonic.

In some possible implementations, the millimeter-wave antenna-in-package further includes a second harmonic suppression unit. The second harmonic suppression unit includes a second transmission part and a second bent part. The second transmission part extends along the first reference direction, a first end of the second bent part is connected to a first end of the second transmission part, a second end of the second bent part and a second end of the second transmission part form a second opening, and the second end of the antenna matching stub is connected to the feeder transmission strap through the first transmission part and the second transmission part that are connected in sequence, to suppress two different orders of harmonics.

In some possible implementations, the second bent part includes a second horizontal extension part and a second vertical connection part. An extension direction of the second horizontal extension part is parallel to the first reference direction, and an extension direction of the second vertical connection part is perpendicular to the first reference direction. A first end of the second vertical connection part is connected to the first end of the second transmission part, and a second end of the second vertical connection part is connected to a first end of the second horizontal extension part. A second end of the second horizontal extension part and the second end of the second transmission part form the second opening, and a length of the second horizontal extension part is less than or equal to that of the second transmission part. The second bent part facilitates a design of a related parameter, and the harmonic suppression may be easily implemented by the millimeter-wave antenna-in-package at the required specific frequency.

In some possible implementations, the length of the first horizontal extension part is equal to ¼ of the wavelength of the second harmonic in the transmit signal of the millimeter-wave antenna-in-package, and the length of the second horizontal extension part is equal to ¼ of a wavelength of a third harmonic in the transmit signal of the millimeter-wave antenna-in-package, to effectively suppress the secondary harmonic and the third harmonic.

In some possible implementations, the first bent part and the second bent part are located on a same side of an extension line of the antenna matching stub.

In some possible implementations, the first bent part and the second bent part are located on the same side of the extension line of the antenna matching stub to save space and facilitate routing of another antenna cabling structure in the millimeter-wave antenna-in-package.

In some possible implementations, an orientation of the first opening is opposite to an orientation of the second opening, and the first vertical connection part and the second vertical connection part use a same connection structure, to save space.

In some possible implementations, the first antenna feeder is made of a same material and disposed in a same layer, and forms an integrated structure, to simplify a process and reduce a manufacturing requirement.

In some possible implementations, the millimeter-wave antenna-in-package further includes a ground layer. The radiation structure is located on an upper side of the ground layer, and the first antenna feeder is located on a lower side of the ground layer, to reduce interference with a transmission signal through a shielding function of the ground layer.

In some possible implementations, the millimeter-wave antenna-in-package further includes a second antenna feeder. The second antenna feeder and the first antenna feeder have a same structure. A connection line from a connection point of the first end of the antenna matching stub in the first antenna feeder and the radiation structure to the center of the radiation structure is perpendicular to a connection line from the first end of the antenna matching stub in the second antenna feeder and the radiation structure to the center of the radiation structure, so that an antenna unit in the millimeter-wave antenna-in-package can form two orthogonal signals, to implement a dual-polarized characteristic.

In some possible implementations, the first reference direction of the first antenna feeder is perpendicular to a first reference direction of the second antenna feeder.

In some possible implementations, the radiation structure includes a drive radiating element and a parasitic radiating element that are disposed opposite to each other; and the first end of the antenna matching stub is connected to the drive radiating element, to expand the antenna package's bandwidth.

In some possible implementations, the millimeter-wave antenna-in-package further includes a radio frequency transceiver chip. The substrate is connected to the radio frequency transceiver chip.

An embodiment of this application further provides a terminal device. The terminal device includes a printed circuit board and the millimeter-wave antenna-in-package according to any one of the foregoing implementations. The millimeter-wave antenna-in-package is connected to the printed circuit board.

DESCRIPTION OF EMBODIMENTS

To make the objectives, technical solutions, and advantages of this application clearer, the following clearly describes the technical solutions in this application with reference to the accompanying drawings in this application. Obviously, the described embodiments are a part rather than all of embodiments of this application. All other embodiments obtained by a person of ordinary skill in the art based on embodiments of this application without creative efforts shall fall within the protection scope of this application.

In the specification, embodiments, claims, and accompanying drawings of this application, the terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, include a series of steps or units. "Connection" and "connecting" should be understood in a broad sense, for example, a direct connection, an indirect connection through an intermediate medium, or an internal connection between two elements. "On", "below", "horizontal", "vertical", and the like are used only relative to the orientation of the components in the accompanying drawings. These directional terms are relative concepts, are used for relative descriptions and clarifications, and may change accordingly as positions at which the components in the accompanying drawings are placed change. Products, or devices are not necessarily limited to those structures or units that are literally listed, but may include other structures or units that are not literally listed or that are inherent to such structures or devices.

An embodiment of this application provides a terminal device. The terminal device includes a printed circuit board and a millimeter-wave antenna-in-package connected to the printed circuit board. A band-stop characteristic curve may be formed at frequencies needing to be suppressed by using the millimeter-wave antenna-in-packages disclosed herein, to achieve harmonic suppression effect. The following describes embodiments of the millimeter-wave antenna-in-packages.

Figure 1:
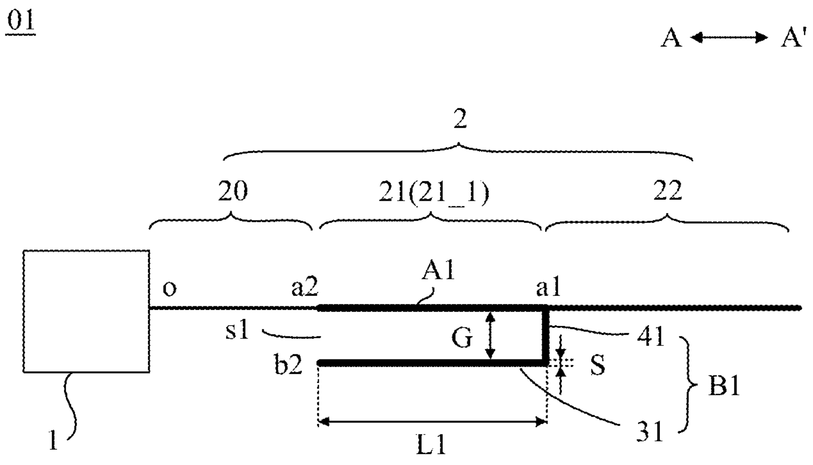
FIG. 1 is a schematic diagram of a structure of an antenna unit according to an embodiment of this application.

Refer to FIG. 1. The millimeter-wave antenna-in-package provided in this embodiment of this application includes an antenna unit 01.

In some possible implementations, the millimeter-wave antenna-in-package may include one antenna unit 01 (referring to FIG. 1).

Figure 2:
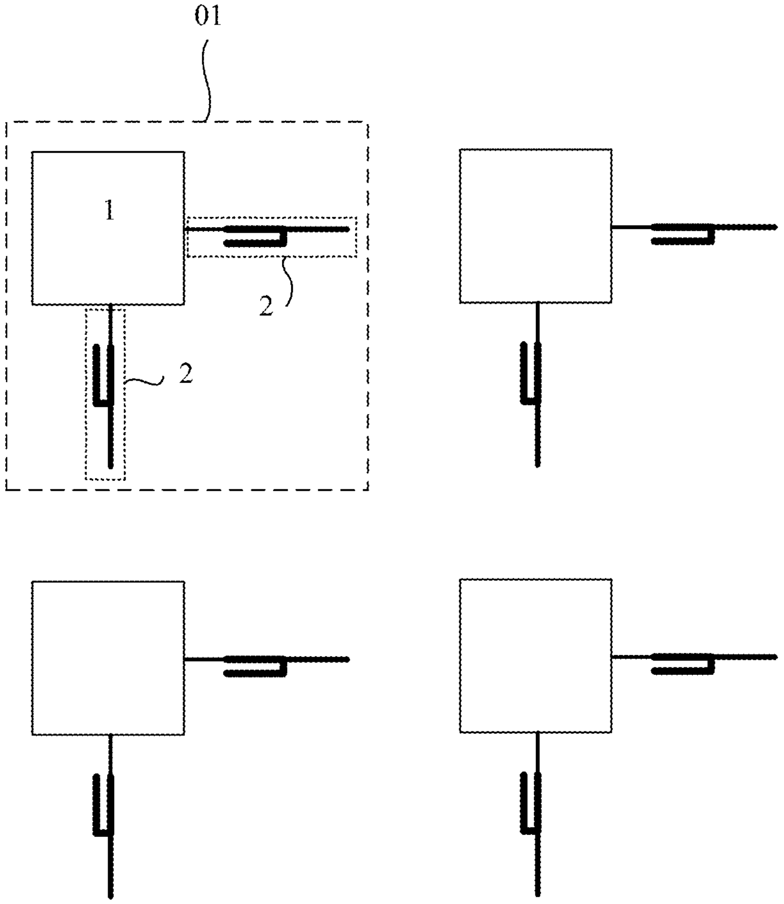
FIG. 2 is a schematic diagram of a structure of a millimeter-wave antenna-in-package according to an embodiment of this application.

In some possible implementations, the millimeter-wave antenna-in-package in this application may include a plurality of antenna units 01. In referring to FIG. 2, for example, the millimeter-wave antenna-in-package may include the plurality of antenna units 01 arranged in an array (not limited to four antenna units 01 shown in FIG. 2), to improve a coverage capability of the millimeter-wave antenna-in-package, and ensure that the millimeter-wave antenna-in-package may perform beam scanning.

The following further describes the millimeter-wave antenna-in-package with reference to a single antenna unit 01.

Figure 3:
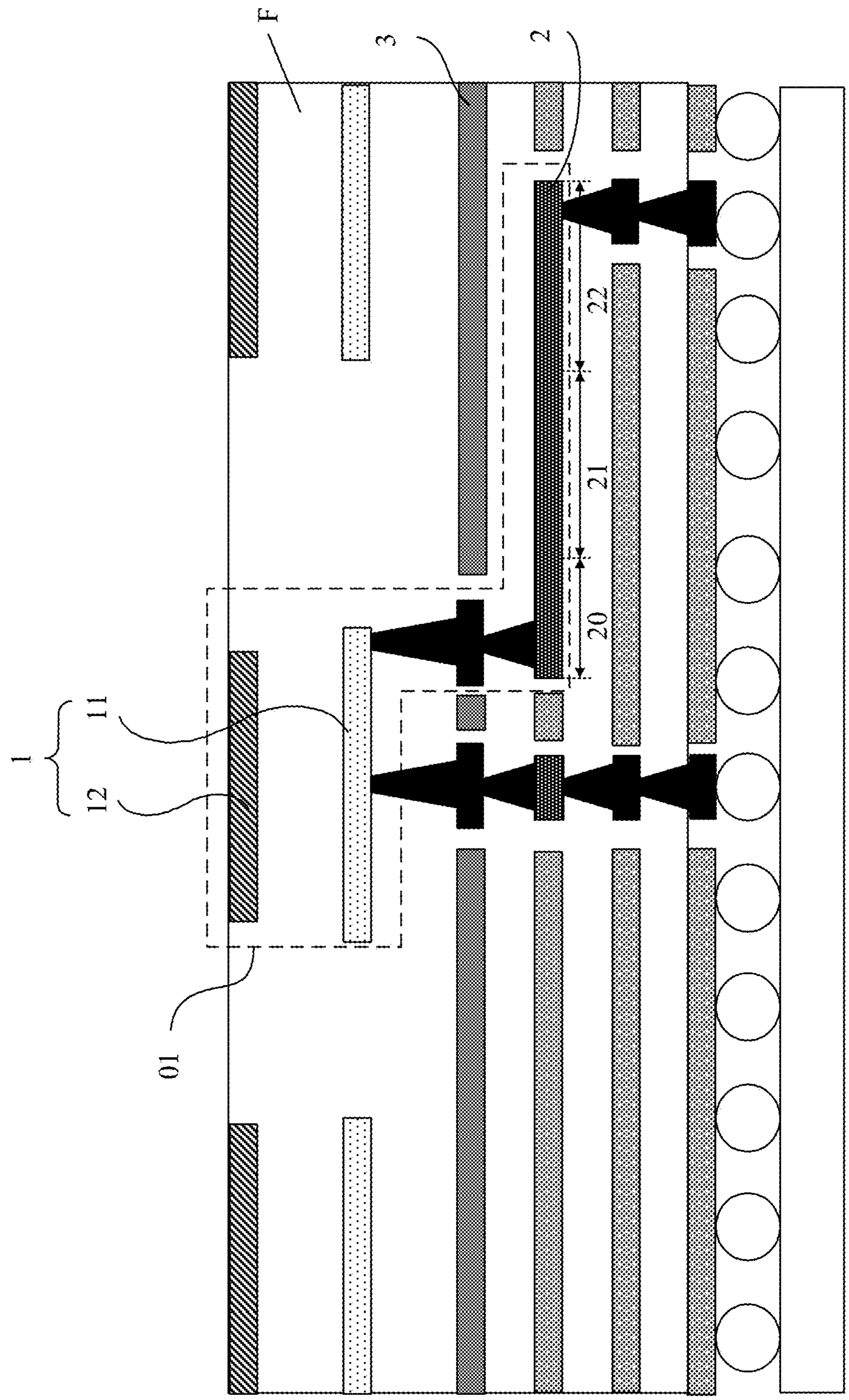
FIG. 3 is a schematic diagram of a cross-sectional structure of a millimeter-wave antenna-in-package according to an embodiment of this application.

Refer to FIG. 3 (a schematic diagram of a partial cross-section of the millimeter-wave antenna-in-package at a position at which the antenna unit 01 is disposed). The millimeter-wave antenna-in-package includes a substrate (may also be referred to as a package substrate), and the antenna unit 01 is disposed in a filling medium F of the substrate.

As shown in FIG. 1, the antenna unit 01 includes a radiation structure 1 and at least one antenna feeder 2. FIG. 1 is merely an example in which the antenna unit 01 includes one antenna feeder 2. In some other possible implementations, the antenna unit 01 also includes more than two antenna feeders 2. For example, the antenna unit 01 shown in FIG. 2 includes two antenna feeders 2.

On this basis, as shown in FIG. 1, the antenna feeder 2 includes: an antenna matching stub 20, at least one harmonic suppression unit 21, and a feeder transmission strap 22. FIG. 1 is merely an example in which the antenna feeder 2 includes one harmonic suppression unit 21. In some other possible implementations, the antenna feeder 2 may also include more than two harmonic suppression units. For example, the antenna feeder 2 shown in FIG. 4 includes two harmonic suppression units 21 (21_1 and 21_2).

As shown in FIG. 1, a first end o of the antenna matching stub 20 is connected to the radiation structure 1, and the antenna matching stub 20 extends from the first end o towards a side that is away from the radiation structure 1. In this specification, an extension direction of the antenna matching stub 20 is defined as a first reference direction AA'. To be specific, the antenna matching stub 20 extends from a connection point (feeding point) of the radiation structure 1 along the first reference direction AA' towards the side that is away from the radiation structure 1.

As shown in FIG. 1, the antenna feeder 2 includes the one harmonic suppression unit 21 (may also be represented as a first harmonic suppression unit 21_1). The first harmonic suppression unit 21_1 includes a first transmission part A1 and a first bent part B1. The first transmission part A1 extends along the first reference direction AA'. A first end of the first bent part B1 is connected to a first end a1 of the first transmission part. A second end b2 of the first bent part B1 and a second end a2 of the first transmission part A1 form a first opening s1.

On this basis, a second end (that is, one end of the antenna matching stub 20 that is not connected to the radiation structure 1) of the antenna matching stub 20 is connected to an end part of the feeder transmission strap 22 through the first transmission part A1, and the feeder transmission strap 22 extends along the first reference direction AA'. To be specific, one end of the first transmission part A1 is connected to the second end of the antenna matching stub 20, and the other end of the first transmission part A1 is connected to the feeder transmission strap 22. It may be understood herein that the antenna matching stub 20, the first transmission part A1, and the feeder transmission strap 22 all extend along the first reference direction AA'. Although they may have different line widths, they are located on a same reference line.

It should be noted that FIG. 1 is merely an example in which the first bent part B1 is located on a lower side of the first transmission part A1, and the first opening s1 formed by the first bent part B1 and the first transmission part A1 faces a side that is close to the radiation structure 1. In some possible implementations, the first bent part B1 may also be located on an upper side of the first transmission part A1. In some possible implementations, the first opening s1 formed by the first bent part B1 and the first transmission part A1 may face the side that is away from the radiation structure 1. This is not specifically limited in this application.

In conclusion, in an example millimeter-wave antenna-in-package in this application, a harmonic suppression unit is disposed between the antenna matching stub and the feeder transmission strap. The harmonic suppression unit includes a transmission part connected in series between the antenna matching stub and the feeder transmission strap and a bent part connected to the transmission part. The bent part and the transmission part form an opening structure. This is equivalent to serially connecting a resonant circuit between the antenna matching stub and the feeder transmission strap, so that the band-stop characteristic curve may be formed at frequencies needing to be suppressed, to achieve the harmonic suppression effect. In addition, a harmonic suppression unit with an opening structure has a low requirement on manufacturing process precision. This facilitates manufacturing of a millimeter-wave antenna-in-package with a narrow radio frequency feeder, and also meets requirements of the millimeter-wave antenna-in-package for a compact structure, a flexible design, and easy to package. Manufacturability and mass production of the millimeter-wave antenna-in-package are improved.

It should be noted that the first bent part B1 in the first harmonic suppression unit 21_1 is not limited to the shape shown in FIG. 1, provided that the first bent part B1 bends and extends from a first end connected to the first transmission part A1 towards the second end of the first transmission part A1 and forms an opening with the second end of the first transmission part A1, to meet a condition that the first harmonic suppression unit 21_1 forms a serially-connected resonant circuit. For example, the first bent part B1 may use a linear bending structure, or may use a curve bending structure, or may use a bending structure including a straight line and a curve. This is not specifically limited in this application.

Figure 5A:
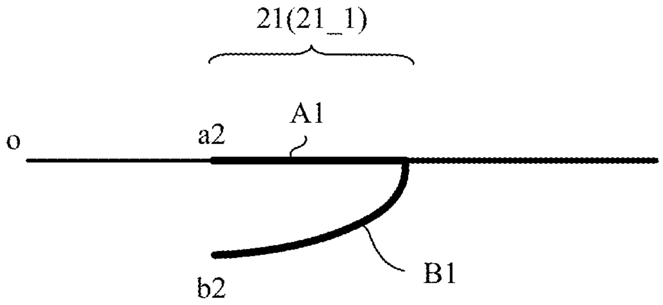
FIG. 5*a* is a schematic diagram of a structure of an antenna feeder in an antenna unit according to an embodiment of this application.

For example, in some embodiments, as shown in FIG. 5*a*, the first bent part B1 may use an arc-shaped curve bending structure.

Figure 5B:
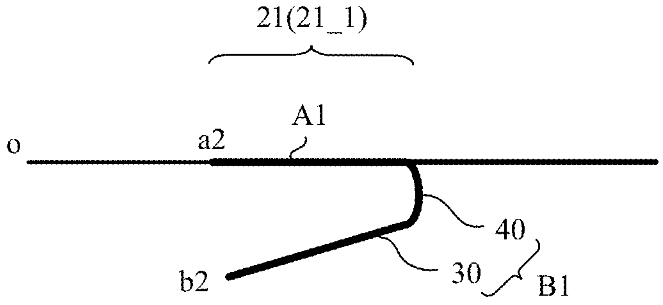
FIG. 5*b* is a schematic diagram of a structure of an antenna feeder in an antenna unit according to an embodiment of this application.

For example, in some embodiments, as shown in FIG. 5*b*, the first bent part B1 may include an extension part 30 and a connection part 40. The extension part 30 uses a linear structure that is neither parallel nor perpendicular to the first reference direction AA'. The connection part 40 uses a curved arc-shaped structure, and two ends of the connection part 40 are respectively connected to the linear extension part 30 and the first transmission part A1. Certainly, the extension part 30 may also be parallel to the first reference direction AA'. Alternatively, the connection part 40 may use a linear structure that is neither parallel to nor perpendicular to the first reference direction AA'.

For example, in some embodiments, as shown in FIG. 1, the first bent part B1 uses a linear bent structure. In this case, the first harmonic suppression unit 21_1 uses a U-shaped structure.

Specifically, as shown in FIG. 1, on a basis that the first harmonic suppression unit 21_1 includes the first transmission part A1, the first harmonic suppression unit 21_1 further includes a first horizontal extension part 31 and a first vertical connection part 41. An extension direction of the first horizontal extension part 31 is parallel to the first reference direction AA', and an extension direction of the first vertical connection part 41 is perpendicular to the first reference direction AA'. A first end of the first vertical connection part 41 is connected to the first end a1 of the first transmission part A1, a second end of the first vertical connection part 41 is connected to a first end of the first horizontal extension part 31, and a second end (b2) of the first horizontal extension part 31 and the second end a2 of the first transmission part A1 form a first opening s1.

In some possible implementations, as shown in FIG. 1, to ensure that an effective capacitor can be formed between the first horizontal extension part 31 and the first transmission part A1, a length of the first horizontal extension part 31 may be less than or equal to a length of the first transmission part A1.

Compared with the harmonic suppression unit 21 shown in FIG. 5*a* and FIG. 5*b*, a harmonic suppression unit 21 using the U-shaped structure in FIG. 1 facilitates a design of a related parameter, and is easier to implement harmonic suppression at a required specific frequency by using the millimeter-wave antenna-in-package.

Figure 8:
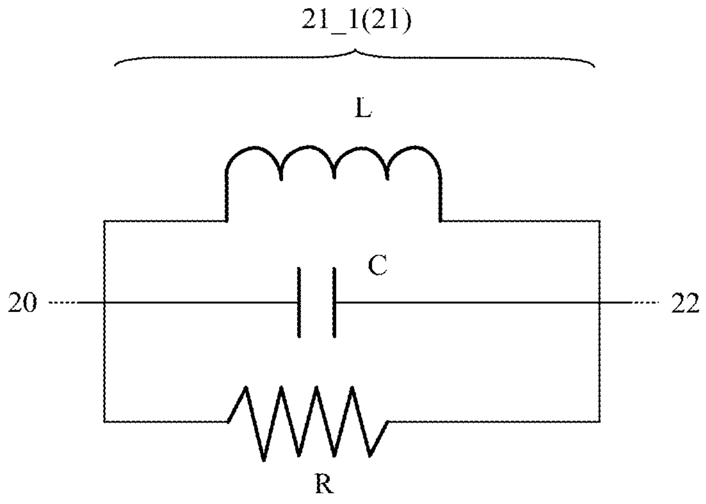
FIG. 8 is a schematic diagram of an equivalent circuit of a harmonic suppression unit according to an embodiment of this application.

Specifically, for the harmonic suppression unit 21 connected between the antenna matching stub 20 and the feeder transmission strap 22 in FIG. 1, an equivalent circuit of the harmonic suppression unit 21 may be a circuit shown in FIG. 8, that is, the serially-connected resonant circuit between the antenna matching stub 20 and the feeder transmission strap 22. A transmission loss of the first transmission part A1 in a medium is equivalent to a resistor R; the opening structure formed by the first transmission part A1, the first horizontal extension part 31, and the first vertical connection part 41 is equivalent to an inductor L; and a part between the first transmission part A1 and the first horizontal extension part 31 is equivalent to a capacitor C. Therefore, based on an actual requirement, the inductor L, the resistor R, and the capacitor C in the resonant circuit may be designed by disposing the harmonic suppression unit 21, so that the band-stop characteristic curve may be formed at the frequencies needing to be suppressed, and the harmonic suppression effect may be achieved.

As shown in FIG. 1, it may be understood that a length of a slit formed between the first horizontal extension part 31 and the first transmission part A1 is approximately a quarter of a wavelength of a harmonic in a transmit signal of the millimeter-wave antenna-in-package at the frequencies needing to be suppressed. When the length of the first horizontal extension 31 is less than or equal to the length of the first transmission part A1, the length of the slit is a length L1 of the first horizontal extension part 31. In other words, the length L1 of the first horizontal extension part 31 is approximately a quarter of the wavelength of the transmit signal at the frequencies needing to be suppressed. Therefore, when the harmonic suppression unit 21 is actually designed, the length L1 of the first horizontal extension part 31 may be set based on a wavelength of a harmonic that needs to be suppressed (a wavelength of the harmonic in the medium). For example, the length L1 of the first horizontal extension part 31 may be equal to a quarter of a wavelength of a second harmonic in the transmit signal (an electromagnetic wave), to suppress the secondary harmonic.

In addition, it may be further understood that, a shorter length L1 of the first horizontal extension part 31 indicates a higher frequency needing to be suppressed for a signal; a larger width S of the first horizontal extension part 31 indicates a smaller formed inductor L, and a smaller width G of a slit between the first horizontal extension part 31 and the first transmission part A1 indicates a larger formed capacitor C. Therefore, a larger Q value of the millimeter-wave antenna-in-package indicates a smaller bandwidth of a band needing to be suppressed. To be specific, the bandwidth of the harmonic band needing to be suppressed may be controlled by adjusting the width S of the first horizontal extension part 31 and the width G of the slit formed between the first horizontal extension part 31 and the first transmission part A1.

In some embodiments, the antenna feeder 2 may include a plurality of harmonic suppression units 21 that are connected in series.

Figure 4:
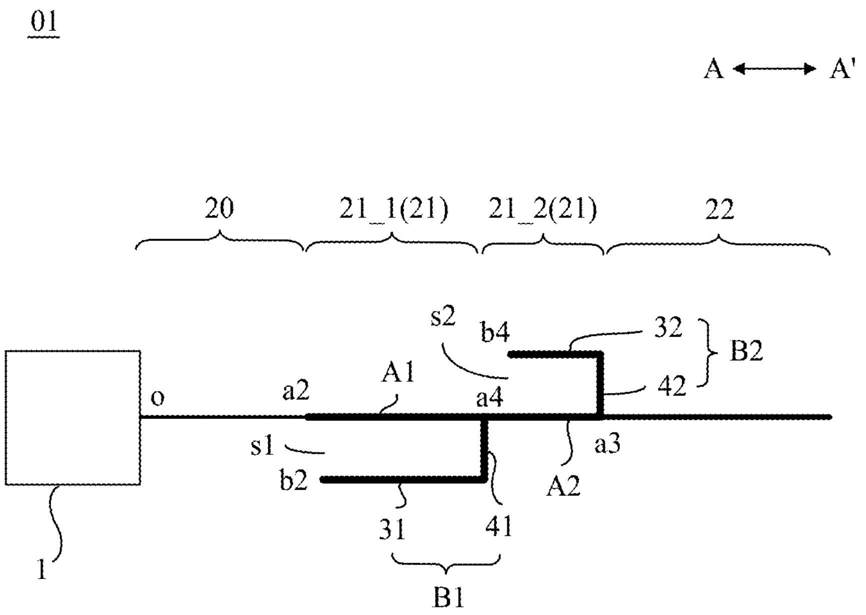
FIG. 4 is a schematic diagram of a structure of an antenna unit according to an embodiment of this application.

For example, as shown in FIG. 4, in some possible implementation, on the basis that the antenna feeder 2 includes the first harmonic suppression unit 21_1, the antenna feeder 2 further includes a second harmonic suppression unit 21_2. In other words, the antenna feeder 2 includes two harmonic suppression units 21 that are connected in series.

As shown in FIG. 4, the second harmonic suppression unit 21_2 includes a second transmission part A2 and a second bent part B2. The second transmission part A2 extends along the first reference direction AA', and a first end of the second bent part B2 is connected to a first end a3 of the second transmission part A2. A second end b4 of the second bent part B2 and a second end a4 of the second transmission part A2 form a second opening s2. In addition, the second transmission part A2 and the first transmission part A1 are connected in sequence (connected in series), the second end of the antenna matching stub 20 (that is, an end of the antenna matching stub 20 is not connected to the radiation structure 1) is connected to an end of the feeder transmission strap 22 by connecting the first transmission part A1 and the second transmission part A2 in sequence, and the feeder transmission strap 22 extends along the first reference direction AA'.

It may be understood herein that the antenna matching stub 20, the first transmission part A1, the second transmission part A2, and the feeder transmission strap 22 all extend along the first reference direction AA'. Although they may have different line widths, they are located on a same reference line.

It should be noted that FIG. 4 is merely an example in which the second transmission part A2 is located on a side of the first transmission part A1 that is away from the radiation structure 1 (that is, the second harmonic suppression unit 21_2 is located on a side of the first harmonic suppression unit 21_1 that is away from the radiation structure 1). In other possible implementations, the second transmission part A2 may also be disposed on a side of the first transmission part A1 that is close to the radiation structure 1, for example, the second harmonic suppression unit 21_2 is disposed on a side of the first harmonic suppression unit 21_1 that is close to the radiation structure 1.

In some possible implementations, as shown in FIG. 4, the second bent part B2 uses a linear bent structure. In this case, the second harmonic suppression unit 21_2 uses a U-shaped structure. In this case, in addition to the second transmission part A2, the second harmonic suppression unit 21_2 further includes a second horizontal extension part 32 and a second vertical connection part 42. An extension direction of the second horizontal extension part 32 is parallel to the first reference direction AA', and an extension direction of the second vertical connection part 42 is perpendicular to the first reference direction AA'. A first end of the second vertical connection part 42 is connected to the first end a3 of the second transmission part A2, and a second end of the second vertical connection part 42 is connected to a first end of the second horizontal extension part 32. A second end (that is, b4) of the second horizontal extension part 32 and the second end a4 of the second transmission part A2 form a second opening s2.

In some possible implementations, as shown in FIG. 4, to ensure that an effective capacitor can be formed between the second horizontal extension part 32 and the second transmission part A2, a length of the second horizontal extension part 32 may be set to be less than or equal to a length of the second transmission part A2.

In addition, other related settings of the second harmonic suppression unit 21_2 are basically consistent with corresponding settings of the first harmonic suppression unit 21_1. For details, refer to descriptions of the corresponding part of the first harmonic suppression unit 21_1.

For example, for other related settings of the second opening s2 and the second bent part B2 in the second harmonic suppression unit 21_2, refer to the corresponding description of the first opening s1 and the first bent part B1 of the first harmonic suppression unit 21_1. Details are not described herein.

The following further describes settings of the first harmonic suppression unit 21_1 and the second harmonic suppression unit 21_2.

In some possible implementations, as shown in FIG. 4, the first vertical connection part 41 in the first harmonic suppression unit 21_1 and the second vertical connection part 42 in the second harmonic suppression unit 21_2 are respectively located on different sides of an extension line of the antenna matching stub 20. To be specific, the first opening s1 of the first harmonic suppression unit 21_1 and the second opening s2 of the second harmonic suppression unit 21_2 are located on two sides of the extension line of the antenna matching stub 20.

Figure 6:
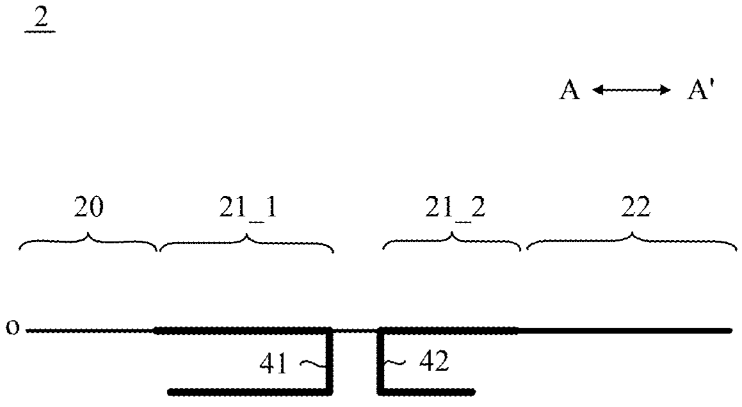
FIG. 6 is a schematic diagram of a structure of an antenna feeder in an antenna unit according to an embodiment of this application.
Figure 7:
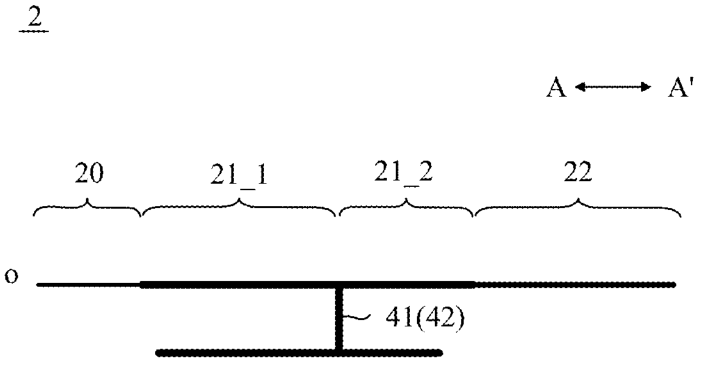
FIG. 7 is a schematic diagram of a structure of an antenna feeder in an antenna unit according to an embodiment of this application.

In some possible implementations, to save space and facilitate routing of another antenna cabling structure in the millimeter-wave antenna-in-package (such as a signal line and a power winding) in the millimeter-wave antenna-in-package, as shown in FIG. 6 and FIG. 7, the first vertical connection part 41 in the first harmonic suppression unit 21_1 and the second vertical connection part 42 in the second harmonic suppression unit 21_2 are located on a same side of the extension line of the antenna matching stub 20. To be specific, the first opening s1 of the first harmonic suppression unit 21_1 and the second opening s2 of the second harmonic suppression unit 21_2 are located on a same side of the extension line of the antenna matching stub 20.

In some possible implementations, as shown in FIG. 4, the first transmission part A1 in the first harmonic suppression unit 21_1 may be directly connected to the second transmission part A2 in the second harmonic suppression unit 21_2. In other possible implementations, as shown in FIG. 6, the first transmission part A1 in the first harmonic suppression unit 21_1 and the second transmission part A2 in the second harmonic suppression unit 21_2 may be connected by using an intermediate connection structure.

In some possible implementations, as shown in FIG. 4, an opening direction of the first opening s1 of the first harmonic suppression unit 21_1 may be the same as that of the second opening s2 of the second harmonic suppression unit 21_2. In other possible implementations, as shown in FIG. 6, the opening direction of the first opening s1 of the first harmonic suppression unit 21_1 may be opposite to that of the second opening s2 of the second harmonic suppression unit 21_2.

For example, in some embodiments, as shown in FIG. 7, the first opening s1 of the first harmonic suppression unit 21_1 and the second opening s2 of the second harmonic suppression unit 21_2 may be disposed on the same side of the extension line of the antenna matching stub 20, the direction of the first opening s1 of the first harmonic suppression unit 21_1 is opposite to the direction of the second opening s2 of the second harmonic suppression unit 21_2, and the first vertical connection part 41 of the first harmonic suppression unit 21_1 and the second vertical connection part 42 of the second harmonic suppression unit 21_2 use a same connection structure, to save space to a greater extent.

In addition, a person skilled in the art may understand that, a spurious signal problem caused by the second harmonic in the transmit signal of the millimeter-wave antenna-in-package is relatively severe, and a spurious signal problem caused by a third harmonic is medium-serious, and a spurious signal problem caused by a higher-order harmonic is relatively small. Based on this, when the harmonic suppression unit 21 is actually designed, suppression on the second harmonic and the third harmonic is preferentially considered.

For example, in an embodiment in which the antenna feeder 2 in the antenna unit 01 includes the one harmonic suppression unit 21, the harmonic suppression unit 21 may be set to suppress the secondary harmonic.

In some possible implementations, a millimeter-wave antenna-in-package using the antenna unit 01 in FIG. 1 is used as an example. A length of the first transmission part A1 in the harmonic suppression unit 21 (refer to an equivalent circuit diagram in FIG. 8) is equal to ¼ of the wavelength of the second harmonic in the transmit signal of the millimeter-wave antenna-in-package.

Figure 9:
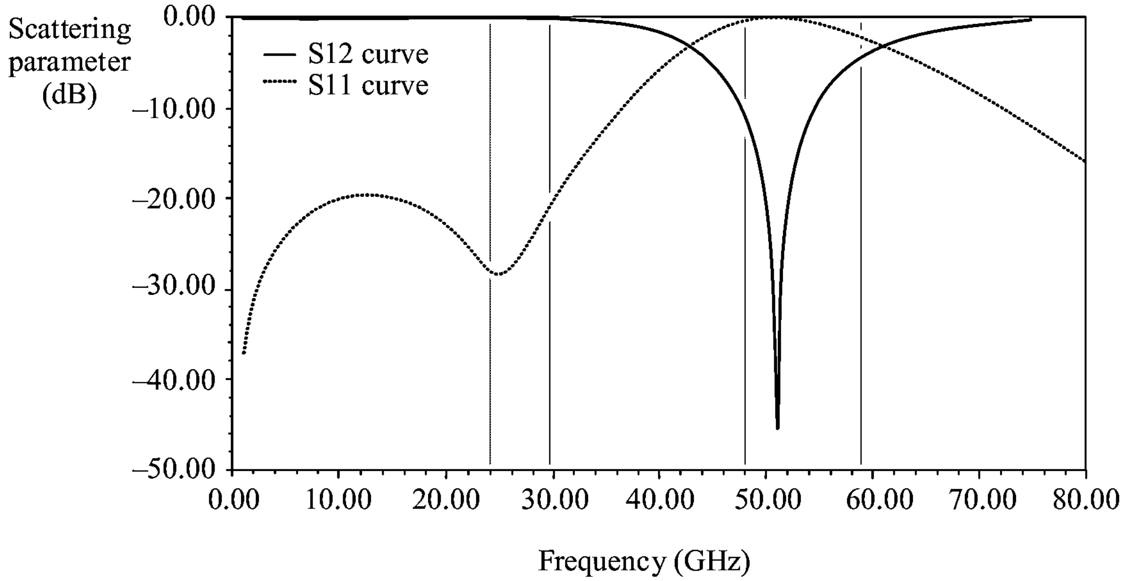
FIG. 9 is an S parameter curve of a millimeter-wave antenna-in-package according to an embodiment of this application.
Figure 10:
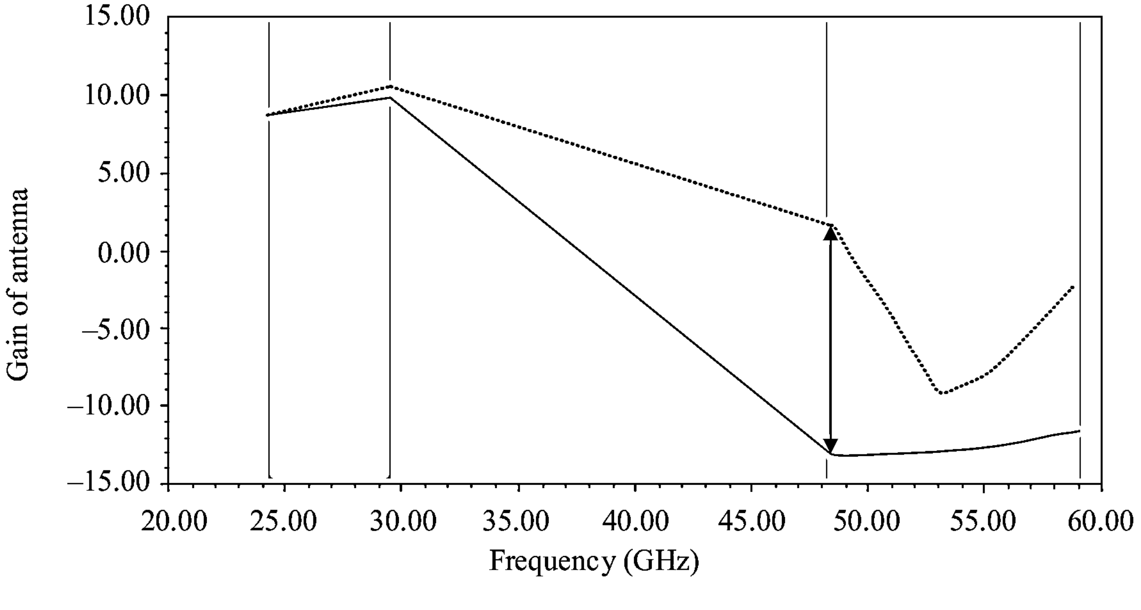
FIG. 10 is a gain curve of a millimeter-wave antenna-in-package according to an embodiment of this application and a millimeter-wave antenna-in-package in related technologies.

The millimeter-wave antenna-in-package can be simulated in an operating band of 28 GHz (24 GHz to 30 GHz). In referring to S parameter curves (S11 curve and S12 curve), that is, scattering parameter curves in FIG. 9, it can be learned from the S12 curve (also be referred to as a transmission coefficient curve) that, a transmission coefficient of the millimeter-wave antenna-in-package is not lost (that is, the loss is low, close to 0) in the operating band of 28 GHz. In other words, the millimeter-wave antenna-in-package has a strong transmission capability in the operating band of 28 GHz. In a secondary harmonic suppression area (48 GHz to 60 GHz), it can be learned from the S11 curve (also be referred to as a reflection coefficient curve) and the S12 curve that, when the reflection coefficient is increased, the transmission coefficient is greatly decreased, and a band-stop characteristic is obvious. In addition, as shown in FIG. 10, compared with a gain curve (dashed line in FIG. 10) of the millimeter-wave antenna-in-package without the harmonic suppression unit 21, it can be learned from the gain curve (solid line in FIG. 10) of the millimeter-wave antenna-in-package with the harmonic suppression unit 21 that: The suppression on the second harmonic by the millimeter-wave antenna-in-package is improved by about 15 dB, and the suppression effect is obvious. In other words, the millimeter-wave antenna-in-package can effectively suppress the secondary harmonic.

For example, in an embodiment in which the antenna feeder 2 in the antenna unit 01 includes two harmonic suppression units 21, one harmonic suppression unit 21 may be set to suppress the secondary harmonic, and the other harmonic suppression unit 21 may be set to suppress the third harmonic.

Figure 11:
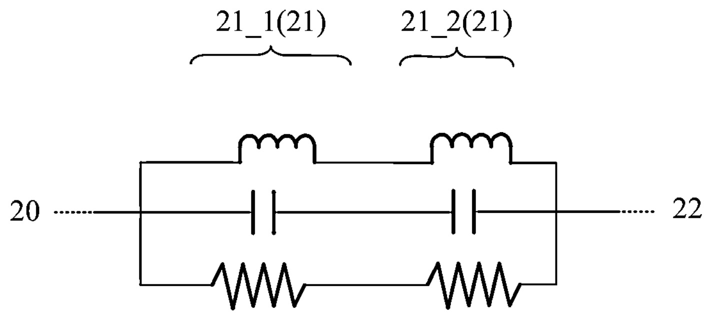
FIG. 11 is a schematic diagram of an equivalent circuit of a harmonic suppression unit according to an embodiment of this application.

In some possible implementations, the millimeter-wave antenna-in-package using the antenna unit 01 in FIG. 4 is used as an example. A length of the first transmission part A1 in the first harmonic suppression unit 21_1 is equal to ¼ of the wavelength of the second harmonic in the transmit signal of the millimeter-wave antenna-in-package, and the length of the second transmission part A2 in the second harmonic suppression unit 21_2 is equal to ¼ of a wavelength of the third harmonic in the transmit signal of the millimeter-wave antenna-in-package. For an equivalent circuit diagram of the first harmonic suppression unit 21_1 and the second harmonic suppression unit 21_2 that are connected in series, refer to FIG. 11. An equivalent resistor, an equivalent capacitor, and an equivalent inductor in the first harmonic suppression unit 21_1 one-to-one correspond to an equivalent resistor, an equivalent capacitor, and an equivalent inductor in the second harmonic suppression unit 21_2, and are connected in series to form a resonant circuit.

Figure 12:
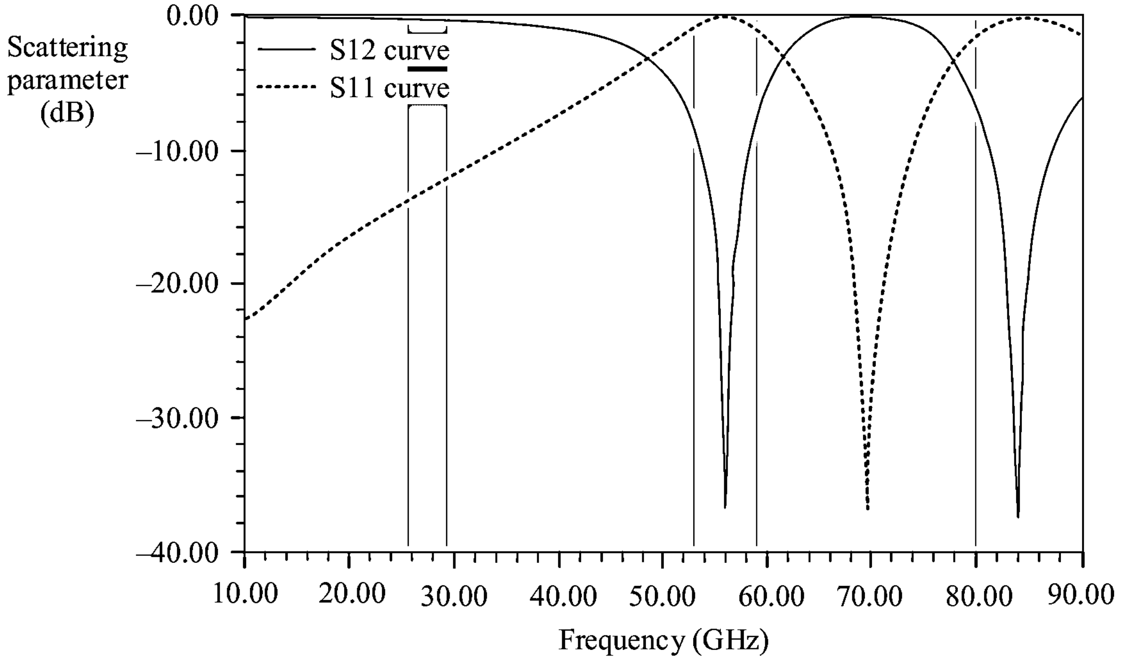
FIG. 12 is an S parameter curve of a millimeter-wave antenna-in-package according to an embodiment of this application.

The millimeter-wave antenna-in-package is actually simulated in an operating band of 28 GHz (24 GHz to 30 GHz). In referring to S parameter curves (S11 curve and S12 curve), for example, scattering parameter curves in FIG. 12, it can be learned from the S12 curve (also be referred to as a transmission coefficient curve), a transmission coefficient of the millimeter-wave antenna-in-package is not lost (that is, the loss is low, close to 0) in the operating band of 28 GHz, to be specific, the millimeter-wave antenna-in-package has a strong transmission capability in the operating band of 28 GHz. In a second harmonic suppression area (52 GHz to 60 GHz) and a third harmonic suppression area (80 GHz to 90 GHz), it can be learned from the S11 curve (also be referred to as a reflection coefficient curve) and the S12 curve, when the reflection coefficient is increased, the transmission coefficient is greatly decreased, and the band-stop characteristic is obvious, to be specific, the millimeter-wave antenna-in-package can effectively suppress the secondary harmonic and the third harmonic.

Figure 13:
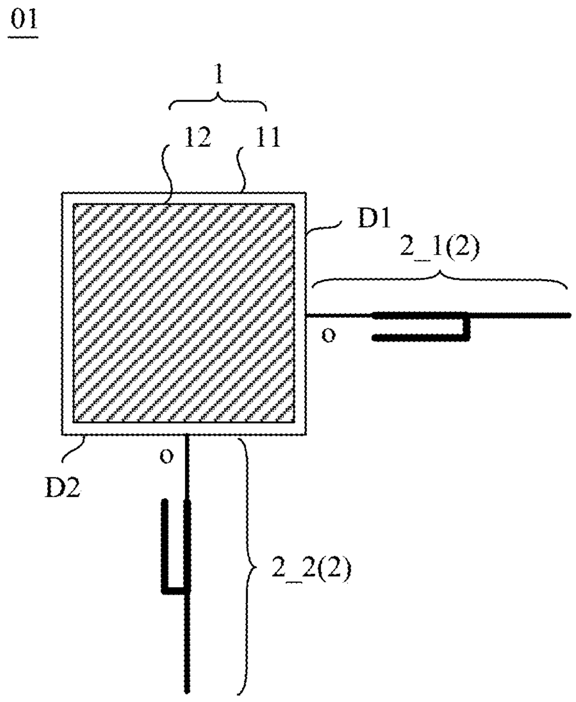
FIG. 13 is a schematic diagram of a structure of an antenna feeder in an antenna unit according to an embodiment of this application.

In addition, in an example millimeter-wave antenna-in-package, to ensure that the antenna unit 01 can form two orthogonal signals to implement a dual-polarization characteristic, as shown in FIG. 13, the antenna unit 01 may include two antenna feeders 2, for example, a first antenna feeder 2_1 and a second antenna feeder 2_2. A connection line from a connection point (that is, the feeding point) of the first antenna feeder 2_1 and the radiation structure 1 to the center of the radiation structure 1 is perpendicular to a connection line from a connection point (that is, the feeding point) of the second antenna feeder 2_2 and the radiation structure 1 to the center of the radiation structure 1.

For example, in some possible implementations, as shown in FIG. 13, the radiation structure 1 in the antenna unit 01 may include a first side edge D1 and a second side edge D2 that are perpendicular to each other. A first end o of the antenna matching stub 20 in the first antenna feeder 2_1 is connected to a midpoint (a feeding point) of the first side edge D1. A first end o of the antenna matching stub 20 in the second antenna feeder 2_2 is connected to a midpoint (a feeding point) of the second side edge D2, to be specific, the feeding point of the first antenna feeder 2_1 is perpendicular to the feeding point of the second antenna feeder 2_2.

It should be noted that FIG. 13 merely uses an example in which the radiation structure 1 is in a positive direction. However, this application is not limited thereto. Alternatively, the radiation structure 1 may be a regular octagon, a circle, or the like.

In some possible implementations, as shown in FIG. 13, an extension direction (that is, the first reference direction AA') of the antenna matching stub 20 in the first antenna feeder 2_1 is perpendicular to an extension direction (that is, the first reference direction AA') of the antenna matching stub 20 in the second antenna feeder 2_2.

In addition, to expand a bandwidth, in some embodiments, as shown in FIG. 3 and FIG. 13, in the antenna unit 01, the radiation structure 1 may include a drive radiating element 11 and a parasitic radiating element 12 that are disposed opposite to each other. The first end o of the antenna matching stub 20 is connected to the drive radiating element 11. For example, the drive radiating element 11 and the parasitic radiating element 12 may have a square structure, and the first end o of the antenna matching stub 20 in the first antenna feeder 2_1 and the first end o of the antenna matching stub 20 in the second antenna feeder 2_2 are respectively connected to midpoints of two side edges that are adjacent to the drive radiating element 11.

In addition, as shown in FIG. 3, to simplify a process and reduce manufacturing requirements, in some embodiments, in the antenna unit 01, the antenna feeder 2 may be made of a same material and disposed in a same layer, and may form an integrated structure, to be specific, the antenna matching stub 20, the harmonic suppression unit 21, and the feeder transmission strap 22 are made of a same material and disposed in a same layer, and form an integrated structure. To be specific, the antenna matching stub 20, the harmonic suppression unit 21, and the feeder transmission strap 22 are manufactured in a same manufacturing process. For example, in some possible implementations, the antenna feeder 2 may be formed by exposing, developing, and etching one conductive film layer.

In addition, as shown in FIG. 3, a ground layer 3 may be disposed on a multilayer package substrate integrated with the millimeter wave antenna-in-package, the radiation structure 1 is disposed on an upper side of the ground layer 3, and the antenna feeder 2, a signal cable, a power winding cable, and the like are disposed on a lower side of the ground layer 3. Therefore, interference with a transmission signal of the millimeter-wave antenna-in-package may be reduced by enabling a shielding function of the ground layer 3.

It should be noted herein that the upper side and the lower side of the ground layer 3 are only a relative position relationship. For instance, the upper side of the ground layer 3 is a side on which the ground layer 3 is close to a top layer of the package substrate, and the lower side of the ground layer 3 is a side on which the ground layer 3 is close to a bottom layer of the package substrate.

Certainly, as shown in FIG. 3, in addition to the foregoing related arrangement structures, the millimeter-wave antenna-in-package may further include another structure disposed in the package substrate, for example, a connection structure (for example, a solder ball) and routing that are located at the bottom layer of the package substrate. The package substrate is connected to a radio frequency integrated circuit (RFIC) by using the connection structure at the bottom layer of the package substrate, to form an intact packaged millimeter-wave package antenna type. Details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A millimeter-wave antenna-in-package, comprising a substrate, a radiation structure and a first antenna feeder that are disposed in the substrate, wherein the first antenna feeder comprises an antenna matching stub, a feeder transmission strap, a first harmonic suppression unit, and a second harmonic suppression unit;

a first end of the antenna matching stub is connected to the radiation structure, the antenna matching stub extends along a side that is away from the radiation structure, and an extension direction of the antenna matching stub is a first reference direction of the first antenna feeder;

the first harmonic suppression unit comprises a first transmission part and a first bent part, the first transmission part extends along the first reference direction of the first antenna feeder, a first end of the first bent part is connected to a first end of the first transmission part, a second end of the first bent part and a second end of the first transmission part form a first opening;

a second end of the antenna matching stub is connected to the feeder transmission strap through the first transmission part and a second transmission part, and the feeder transmission strap extends along the first reference direction of the first antenna feeder, wherein the first end of the first transmission part is connected to a second end of the second transmission part; and the second harmonic suppression unit comprises the second transmission part and a second bent part, wherein the second transmission part extends along the first reference direction of the first antenna feeder, a second end of the second bent part and a second end of the second transmission part form a second opening, the first opening and the second opening are oriented in a same direction, and there are no other openings between the first opening and the second opening along the first reference direction of the first antenna feeder.

2. The millimeter-wave antenna-in-package according to claim 1, wherein the first bent part comprises a first horizontal extension part and a first vertical connection part, an extension direction of the first horizontal extension part is parallel to the first reference direction of the antenna feeder, and an extension direction of the first vertical connection part is perpendicular to the first reference direction of the first antenna feeder;

a first end of the first vertical connection part is connected to the first end of the first transmission part, a second end of the first vertical connection part is connected to a first end of the first horizontal extension part, and a second end of the first horizontal extension part and the second end of the first transmission part form the first opening; and a length of the first horizontal extension part is less than or equal to a length of the first transmission part.

3. The millimeter-wave antenna-in-package according to claim 2, wherein the length of the first horizontal extension part is equal to ¼ of a wavelength of a second harmonic in a transmit signal of the millimeter-wave antenna-in-package.

4. The millimeter-wave antenna-in-package according to claim 1, wherein a first end of the second bent part is connected to a first end of the second transmission part; and the second end of the antenna matching stub is connected to the feeder transmission strap through the first transmission part and the second transmission part that are connected in sequence.

5. The millimeter-wave antenna-in-package according to claim 4, wherein the second bent part comprises a second horizontal extension part and a second vertical connection part, an extension direction of the second horizontal extension part is parallel to the first reference direction of the first antenna feeder, and an extension direction of the second vertical connection part is perpendicular to the first reference direction of the first antenna feeder;

a first end of the second vertical connection part is connected to the first end of the second transmission part, a second end of the second vertical connection part is connected to a first end of the second horizontal extension part, a second end of the second horizontal extension part and the second end of the second transmission part form the second opening; and a length of the second horizontal extension part is less than or equal to that of the second transmission part.

6. The millimeter-wave antenna-in-package according to claim 5, wherein the length of the second horizontal extension part is equal to ¼ of a wavelength of a third harmonic in a transmit signal of the millimeter-wave antenna-in-package.

7. The millimeter-wave antenna-in-package according to claim 4, wherein the first bent part and the second bent part are located on a different side of an extension line of the antenna matching stub.

8. The millimeter-wave antenna-in-package according to claim 7, wherein the first vertical connection part and the second vertical connection part don't use a same connection structure.

9. The millimeter-wave antenna-in-package according to claim 1, wherein the first antenna feeder is made of a same material and disposed in a same layer, and forms an integrated structure.

10. The millimeter-wave antenna-in-package according to claim 1, wherein the millimeter-wave antenna-in-package further comprises a ground layer;

the radiation structure is located on an upper side of the ground layer; and the first antenna feeder is located on a lower side of the ground layer.

11. The millimeter-wave antenna-in-package according to claim 1, wherein the millimeter-wave antenna-in-package further comprises a second antenna feeder; the second antenna feeder and the first antenna feeder have a same structure; and a connection line from a connection point of the first end of the antenna matching stub in the first antenna feeder and the radiation structure to a center of the radiation structure is perpendicular to a connection line from a connection point of the first end of the antenna matching stub in the second antenna feeder and the radiation structure to the center of the radiation structure.

12. The millimeter-wave antenna-in-package according to claim 11, wherein the first reference direction of the first antenna feeder is perpendicular to a first reference direction of the second antenna feeder.

13. The millimeter-wave antenna-in-package according to claim 1, wherein the radiation structure comprises a drive radiating element and a parasitic radiating element that are disposed opposite to each other, and the first end of the antenna matching stub is connected to the drive radiating element.

14. A terminal device, comprising a printed circuit board and a millimeter-wave antenna-in-package, wherein the millimeter-wave antenna-in-package is connected to the printed circuit board, and wherein the millimeter-wave antenna-in-package comprises a substrate, a radiation structure and a first antenna feeder that are disposed in the substrate, wherein the first antenna feeder comprises an antenna matching stub, a feeder transmission strap, a first harmonic suppression unit, and a second harmonic suppression unit;

a first end of the antenna matching stub is connected to the radiation structure, the antenna matching stub extends along a side that is away from the radiation structure, and an extension direction of the antenna matching stub is a first reference direction of the first antenna feeder;

the first harmonic suppression unit comprises a first transmission part and a first bent part, the first transmission part extends along the first reference direction of the first antenna feeder, a first end of the first bent part is connected to a first end of the first transmission part, a second end of the first bent part and a second end of the first transmission part form a first opening;

a second end of the antenna matching stub is connected to the feeder transmission strap through the first transmission part and a second transmission part, and the feeder transmission strap extends along the first reference direction of the first antenna feeder, wherein the first end of the first transmission part is connected to a second end of the second transmission part; and the second harmonic suppression unit comprises the second transmission part and a second bent part, wherein the second transmission part extends along the first reference direction of the first antenna feeder, a second end of the second bent part and a second end of the second transmission part form a second opening, the first opening and the second opening are oriented in a same direction, and there are only two openings between the second end of the first transmission part and the first end of the second transmission part along the first reference direction of the first antenna feeder.

15. The terminal device according to claim 14, wherein the first bent part comprises a first horizontal extension part and a first vertical connection part, an extension direction of the first horizontal extension part is parallel to the first reference direction of the first antenna feeder, and an extension direction of the first vertical connection part is perpendicular to the first reference direction of the first antenna feeder;

a first end of the first vertical connection part is connected to the first end of the first transmission part, a second end of the first vertical connection part is connected to a first end of the first horizontal extension part, and a second end of the first horizontal extension part and the second end of the first transmission part form the first opening; and a length of the first horizontal extension part is less than or equal to that of the first transmission part.

16. The terminal device according to claim 15, wherein the length of the first horizontal extension part is equal to ¼ of a wavelength of a second harmonic in a transmit signal of the millimeter-wave antenna-in-package.

17. The terminal device according to claim 14, wherein a first end of the second bent part is connected to a first end of the second transmission part; and the second end of the antenna matching stub is connected to the feeder transmission strap through the first transmission part and the second transmission part that are connected in sequence.

18. The terminal device according to claim 17, wherein the second bent part comprises a second horizontal extension part and a second vertical connection part, an extension direction of the second horizontal extension part is parallel to the first reference direction of the first antenna feeder, and an extension direction of the second vertical connection part is perpendicular to the first reference direction of the first antenna feeder;

a first end of the second vertical connection part is connected to the first end of the second transmission part, and a second end of the second vertical connection part is connected to a first end of the second horizontal extension part, and a second end of the second horizontal extension part and the second end of the second transmission part form the second opening; and a length of the second horizontal extension part is less than or equal to that of the second transmission part.

19. The terminal device according to claim 18, wherein the length of the second horizontal extension part is equal to ¼ of a wavelength of a third harmonic in a transmit signal of the millimeter-wave antenna-in-package.

20. The terminal device according to claim 17, wherein the first bent part and the second bent part are located on a different side of an extension line of the antenna matching stub.

* * * * *